US010055762B2

(12) United States Patent
Liu et al.

(10) Patent No.: US 10,055,762 B2
(45) Date of Patent: *Aug. 21, 2018

(54) DEEP APPLICATION CRAWLING

(71) Applicant: Microsoft Technology Licensing, LLC, Redmond, WA (US)

(72) Inventors: Jie Liu, Sammamish, WA (US); Suman Kumar Nath, Redmond, WA (US); Jitendra D. Padhye, Kirkland, WA (US); Lenin Ravindranath Sivalingam, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/645,608

(22) Filed: Mar. 12, 2015

(65) Prior Publication Data
US 2015/0186524 A1  Jul. 2, 2015

Related U.S. Application Data

(63) Continuation of application No. 13/490,335, filed on Jun. 6, 2012, now Pat. No. 8,990,183.

(51) Int. Cl.
G06Q 30/02 (2012.01)
G06F 17/30 (2006.01)

(52) U.S. Cl.
CPC ... *G06Q 30/0256* (2013.01); *G06F 17/30864* (2013.01); *G06F 17/30882* (2013.01); *G06Q 30/0267* (2013.01)

(58) Field of Classification Search
CPC ............ G06Q 30/0256; G06Q 30/0267; G06F 17/30882; G06F 17/30864

(Continued)

(56) References Cited

U.S. PATENT DOCUMENTS 5,912,669 A   6/1999  Hsia
5,963,740 A   10/1999 Srivastava et al.
(Continued)

FOREIGN PATENT DOCUMENTS

JP   2004326337 A  * 11/2004  .............. G06F 11/36
JP   2006059044 A  *  3/2006  ............... G06F 9/44

OTHER PUBLICATIONS

Amalfitano, D., A. R. Fasolino, P. Tramontana, A GUI Crawling-Based Technique for Android Mobile Application Testing, Fourth Int'l IEEE Conf. on Software Testing, Verification and Validation, ICST 2012, Berlin, Germany, Mar. 2011, pp. 252-261.

(Continued)

*Primary Examiner* — Phuong Thao Cao
(74) *Attorney, Agent, or Firm* — Medley, Behrens & Lewis, LLC

(57) ABSTRACT

The deep application crawling technique described herein crawls one or more applications, commonly referred to as "apps", in order to extract information inside of them. This can involve crawling and extracting static data that are embedded within apps or resource files that are associated with the apps. The technique can also crawl and extract dynamic data that apps download from the Internet or display to the user on demand, in order to extract data. This extracted static and/or data can then be used by another application or an engine to perform various functions. For example, the technique can use the extracted data to provide search results in response to a user query entered into a search engine. Alternately, the extracted static and/or dynamic data can be used by an advertisement engine to select application-specific advertisements. Or the data can be used by a recommendation engine to make recommendations for goods/services.

20 Claims, 6 Drawing Sheets

(58) Field of Classification Search
USPC .......................................................... 707/709
See application file for complete search history.

(56) References Cited

U.S. PATENT DOCUMENTS

| | | | |
|---|---|---|---|
| 6,126,330 A * | 10/2000 | Knight | G06F 11/3466 714/E11.2 |
| 6,167,534 A | 12/2000 | Straathof et al. | |
| 6,253,208 B1 | 6/2001 | Wittgreffe et al. | |
| 6,308,146 B1 | 10/2001 | La Cascia, Jr. et al. | |
| 6,665,658 B1 | 12/2003 | DaCosta et al. | |
| 7,039,919 B1 | 5/2006 | Hunt | |
| 7,047,446 B1 | 5/2006 | Maurer et al. | |
| 7,076,713 B1 | 7/2006 | Hess | |
| 7,143,088 B2 | 11/2006 | Green | |
| 7,349,836 B2 | 3/2008 | Da Palma et al. | |
| 7,403,886 B2 | 7/2008 | Odhner et al. | |
| 7,490,268 B2 | 2/2009 | Keromytis et al. | |
| 7,519,864 B2 | 4/2009 | Alam et al. | |
| 7,546,315 B2 * | 6/2009 | Kawada | G06Q 10/10 |
| 7,584,194 B2 * | 9/2009 | Tuttle | G06F 17/30864 |
| 7,660,804 B2 | 2/2010 | Wen et al. | |
| 7,853,606 B1 | 12/2010 | Marmaros | |
| 7,890,594 B2 | 2/2011 | Da Palma et al. | |
| 7,930,683 B2 | 4/2011 | Li | |
| 7,941,740 B2 | 5/2011 | Jaiswal et al. | |
| 8,024,384 B2 | 9/2011 | Prabhakar et al. | |
| 8,074,115 B2 | 12/2011 | Stolfo et al. | |
| 8,099,407 B2 | 1/2012 | Auerbach et al. | |
| 8,135,994 B2 | 3/2012 | Keromytis et al. | |
| 8,381,186 B2 | 2/2013 | Khalil | |
| 8,401,221 B2 | 3/2013 | Milov et al. | |
| 8,478,588 B2 | 7/2013 | Da Palma et al. | |
| 8,539,455 B2 | 9/2013 | Berg et al. | |
| 8,589,140 B1 * | 11/2013 | Poulin | G06F 11/3457 463/42 |
| 8,626,739 B2 | 1/2014 | Auerbach et al. | |
| 8,635,204 B1 * | 1/2014 | Xie | G06F 8/74 707/709 |
| 8,713,684 B2 * | 4/2014 | Bettini | G06F 21/57 726/1 |
| 8,751,508 B1 | 6/2014 | Peracha et al. | |
| 8,990,183 B2 | 3/2015 | Liu et al. | |
| 9,104,992 B2 | 8/2015 | Mital et al. | |
| 9,348,671 B1 * | 5/2016 | Chen | G06F 9/542 |
| 2002/0007358 A1 * | 1/2002 | Johnson | G06F 17/2755 |
| 2002/0147570 A1 | 10/2002 | Kraft et al. | |
| 2002/0147942 A1 * | 10/2002 | Moe | G06F 11/3414 714/38.1 |
| 2002/0184615 A1 | 12/2002 | Sumner et al. | |
| 2003/0149968 A1 * | 8/2003 | Imai | G06F 8/73 717/156 |
| 2003/0191791 A1 | 10/2003 | Cyran et al. | |
| 2005/0102318 A1 | 5/2005 | Odhner et al. | |
| 2005/0131884 A1 | 6/2005 | Gross | |
| 2006/0004528 A1 * | 1/2006 | Uehara | G06F 8/71 702/20 |
| 2006/0206878 A1 * | 9/2006 | Uchida | G06F 8/73 717/139 |
| 2006/0230011 A1 * | 10/2006 | Tuttle | G06F 17/30864 706/62 |
| 2006/0282773 A1 * | 12/2006 | Kim | G06F 9/4448 715/703 |
| 2007/0083906 A1 * | 4/2007 | Welingkar | H04N 21/4126 725/110 |
| 2007/0150500 A1 | 6/2007 | Kawada et al. | |
| 2007/0174490 A1 | 7/2007 | Choi et al. | |
| 2007/0174915 A1 | 7/2007 | Gribble et al. | |
| 2007/0234307 A1 | 10/2007 | Luk et al. | |
| 2008/0092182 A1 * | 4/2008 | Conant | H04N 7/17318 725/109 |
| 2008/0120406 A1 * | 5/2008 | Ahmed | G06F 11/3414 709/224 |
| 2008/0244533 A1 | 10/2008 | Berg et al. | |
| 2009/0006364 A1 * | 1/2009 | Konopnicki | G06F 17/30864 |
| 2009/0012795 A1 | 1/2009 | Da Palma et al. | |
| 2009/0019354 A1 | 1/2009 | Jaiswal et al. | |
| 2009/0083271 A1 | 3/2009 | Day et al. | |
| 2009/0113251 A1 | 4/2009 | Goossen et al. | |
| 2009/0216758 A1 * | 8/2009 | Tuttle | G06F 17/30864 |
| 2009/0260000 A1 * | 10/2009 | Pilant | G06F 8/71 717/170 |
| 2010/0057702 A1 * | 3/2010 | Ghosh | G06F 17/30539 707/E17.135 |
| 2010/0100963 A1 | 4/2010 | Mahaffey | |
| 2010/0235311 A1 * | 9/2010 | Cao | G06F 17/30867 706/46 |
| 2010/0242023 A1 * | 9/2010 | Han | G06F 21/12 717/124 |
| 2011/0015917 A1 * | 1/2011 | Wang | G06F 9/455 703/23 |
| 2011/0047597 A1 | 2/2011 | Mahaffey et al. | |
| 2011/0055194 A1 * | 3/2011 | Ghosh | G06F 17/30864 707/709 |
| 2011/0078298 A1 * | 3/2011 | Sakai | G06F 11/0709 709/223 |
| 2011/0106787 A1 | 5/2011 | Waters et al. | |
| 2011/0161486 A1 | 6/2011 | Podjarny et al. | |
| 2011/0184973 A1 | 7/2011 | Bangalore | |
| 2011/0239121 A1 * | 9/2011 | Yamada | G06F 3/1462 715/733 |
| 2011/0246443 A1 * | 10/2011 | Bhatkar | G06F 21/31 707/709 |
| 2011/0252038 A1 | 10/2011 | Schmidt et al. | |
| 2011/0288931 A1 * | 11/2011 | Kuhn | G06F 17/30864 705/14.49 |
| 2011/0289068 A1 | 11/2011 | Teevan et al. | |
| 2011/0314004 A1 | 12/2011 | Mehta | |
| 2011/0314152 A1 * | 12/2011 | Loder | G06F 17/30887 709/225 |
| 2012/0023097 A1 | 1/2012 | LeBeau et al. | |
| 2012/0084292 A1 | 4/2012 | Liang et al. | |
| 2012/0124028 A1 * | 5/2012 | Tullis | G06F 8/60 707/711 |
| 2012/0124061 A1 | 5/2012 | Macbeth et al. | |
| 2012/0124062 A1 | 5/2012 | Macbeth et al. | |
| 2012/0151440 A1 * | 6/2012 | Sakairi | G06F 11/366 717/120 |
| 2012/0166636 A1 | 6/2012 | Page et al. | |
| 2012/0173520 A1 | 7/2012 | Wu et al. | |
| 2012/0240236 A1 * | 9/2012 | Wyatt | G06F 21/564 726/25 |
| 2012/0254162 A1 * | 10/2012 | Asadullah | G06F 17/30657 707/723 |
| 2012/0254835 A1 * | 10/2012 | Muddu | G06F 8/36 717/121 |
| 2012/0284256 A1 * | 11/2012 | Mahajan | G06F 17/3087 707/722 |
| 2012/0323898 A1 | 12/2012 | Kumar et al. | |
| 2013/0091541 A1 | 4/2013 | Beskrovny et al. | |
| 2013/0173582 A1 * | 7/2013 | Liao | G06F 21/6227 707/709 |
| 2013/0191397 A1 | 7/2013 | Avadhanam et al. | |
| 2013/0191920 A1 | 7/2013 | Amit et al. | |
| 2013/0215125 A1 * | 8/2013 | Mahajan | H04M 1/72569 345/522 |
| 2013/0227521 A1 * | 8/2013 | Bourd | G06F 11/3604 717/110 |
| 2013/0227636 A1 | 8/2013 | Bettini et al. | |
| 2013/0227683 A1 | 8/2013 | Bettini et al. | |
| 2013/0232474 A1 | 9/2013 | Leclair et al. | |
| 2013/0238589 A1 * | 9/2013 | Yarramreddy | G06F 17/3087 707/709 |
| 2013/0290319 A1 * | 10/2013 | Glover | G06F 17/3053 707/723 |
| 2013/0290321 A1 | 10/2013 | Shapira et al. | |
| 2013/0326625 A1 | 12/2013 | Anderson et al. | |
| 2014/0114946 A1 * | 4/2014 | Ture | G06F 17/30864 707/709 |

(56) References Cited

U.S. PATENT DOCUMENTS

2014/0149382 A1    5/2014    Brodsky et al.
2015/0186524 A1    7/2015    Liu et al.

OTHER PUBLICATIONS

Davulcu, H., J. Freire, M. Kifer, I. V. Ramakrishnan, A Layered Architecture for Querying Dynamic Web Content, Proc. ACM SIGMOD Int'l Conf. on Management of Data, Jun. 1-3, 1999, pp. 491-502, Philadelphia, Pennsylvania, USA.

Ficstar Software Inc., Custom designed web crawler for advanced web data extraction and data mining, May 2010, retrieved from: www.ficstar.com/Ficstar_Web_Grabber_White_Paper.pdf, pp. 1-17.

Kim, K. S., K. Y. Kim, K.-H. Lee, T. K. Kim, W. S. Cho, Design and implementation of web crawler based on dynamic web collection cycle, ICOIN 2012, Feb. 1-3, 2012, pp. 562-566, Bali, Indonesia.

Li, Y., X. Meng, L. Wang, Q. Li, RecipeCrawler: Collecting Recipe Data from WWW Incrementally, Proc. of the 7th Int'l Conf. Advances in Web-Age Info. Management, WAIM 2006, Hong Kong, China, Jun. 17-19, 2006, pp. 263-274.

Mesbah, A., E. Bozdag, A. van Deursen, Crawling AJAX by Inferring User Interface State Changes, Proc. of the Eighth Int'l Conf. on Web Eng'g, ICWE 2008, Jul. 2008, pp. 122-134, Yorktown Heights, New York, USA.

Nath, S., S. J. Liu, App Crawler: Opening Mobile App Black Boxes, retrieved from research.microsoft.com/en-us/projects/appcrawler/appcrawling.pdf on Jul. 30, 2013, pp. 1-3.

Suganthan, G. C. P., AJAX Crawler, 2012 Int'l Conf. on Data Science & Engineering, ICDSE 2012, Jul. 18-20, 2012, pp. 27-30.

U.S. Office Action, U.S. Appl. No. 13/490,335, dated Aug. 6, 2013, pp. 1-23.

U.S. Office Action, U.S. Appl. No. 13/490,335, dated Dec. 24, 2013, pp. 1-22.

U.S. Final Office Action, U.S. Appl. No. 13/490,335, dated Jun. 6, 2014, pp. 1-21.

U.S. Notice of Allowance, U.S. Appl. No. 13/490,335, dated Nov. 14, 2014, pp. 1-12.

"Reply Submitted with a Request for Continued Examination filed in U.S. Appl. No. 13/490,335", Filed Date: Sep. 8, 2014, 16 Pages.

"Reply to Non-Final Rejection filed in U.S. Appl. No. 13/490,335", Filed Date: Nov. 6, 2013, 13 Pages.

"Non-Final Office Action Issued in U.S. Appl. No. 14/959,938", dated Dec. 15, 2016, 21 Pages.

"Final Office Action Issued in U.S. Appl. No. 14/959,938", dated Aug. 29, 2017, 23 Pages.

"Non-Final Office Action Issued in U.S. Appl. No. 14/959,938", dated Dec. 13, 2017, 22 Pages.

\* cited by examiner

DEEP APPLICATION CRAWLING

CROSS-REFERENCE TO RELATED APPLICATION

This application is a continuation of a prior application entitled "DEEP APPLICATION CRAWLING", which was assigned Ser. No. 13/490,335 and filed Jun. 6, 2012, and issued as U.S. Pat. No. 8,990,183.

BACKGROUND

An application is computer software designed to perform specific tasks. The term "app" has been used as shorthand for "application" in the information technology community for many years. However, the term "app" has become newly popular for mobile applications such as those installed on mobile computing devices.

There are hundreds of thousands of desktop and mobile applications. These include, for example, recipe apps, tips-and-tricks apps, coupon apps, jokes apps, shopping apps, books, and so forth. Often these apps are installed on mobile smart phones or tablet computers and are used from varying locations to find location-specific information, such as, for example, restaurants, hotels, parks or other points of interest in an area.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In general, the deep application crawling technique described herein crawls one or more applications, both mobile and non-mobile, commonly referred to as "apps", in order to extract information inside of them. For example, the technique can crawl and extract static data that are embedded within apps or resource files that are associated with the apps. The technique can also crawl and extract dynamic data that apps download from the Internet or display to the user on demand. The extracted static and/or dynamic data can then be used for various purposes, such as, for example, to assist in searching for data in one or more applications on a user's computing device (e.g., mobile phone) or on a network or other location. For example, the extracted data can be indexed, stored and provided to a search engine. The search engine can then use this data to provide search results in response to a user query entered into the search engine for a Web and marketplace search. In another example of using the crawled static/dynamic data, the extracted data can be used to select app-specific advertisements to be shown when users use the app. Alternately, the crawled static/dynamic data can be used in by a recommendation engine or recommendation application which recommends services, products or coupons to a user. However, these uses of the crawled data are only a few examples. Many other possible uses exist.

More specifically, in one embodiment of the deep application crawling technique, binary data is extracted from an application. The extracted binary data is analyzed to find static data inside of the application, for example, text strings, meta data and Uniform Resource Locators (URLs). Additionally, static text is extracted from text resource files that are associated with the application. The static data obtained from inside the application and the associated text resource files are then stored. The stored static data can then be used for various purposes, such as by a search engine in searching for data in one or more applications on a user's computing device or in one or more other locations (e.g., networks or on a computing cloud).

In one embodiment of the technique, in order to capture the dynamic data, prior to running the application in an emulator, the binary code or data of the application is analyzed in order to discover user controls on each page of the application. These user controls can include buttons, menus, drop down lists and so forth. A navigation script is created that can generate various combinations of user navigation actions for the application based on this analysis. The application or the emulator is modified to log all user actions and data shown to the user in response. The logging code is invoked whenever data is displayed to the user or downloaded to the application. The created navigation script is then injected into an automatic navigation tool that can navigate through various pages of the application according to the script. The automatic navigation tool can be built inside or outside of the emulator. As the navigation tool navigates through the application, logging code captures data displayed to a user and/or data that is downloaded by the application from a network or other source. This captured dynamic data is then stored for further use. For example, it can be provided to a search engine for use in performing a search of one or more applications on a user's computing device on a networks or a on a computing cloud. In another example, it can be provided to an ad-engine for selection of relevant advertisement inside the app. Or it can be used by a recommendation engine to recommend goods and services to a user. Many other uses are possible.

It should be noted that the above-described captured dynamic data can also be combined with captured static data as described above in order to enhance the search capabilities, advertisement selection process or recommendations of goods and services over those obtained by using the static data or the dynamic data alone.

DESCRIPTION OF THE DRAWINGS

The specific features, aspects, and advantages of the disclosure will become better understood with regard to the following description, appended claims, and accompanying drawings where:

DETAILED DESCRIPTION

Figure 1:
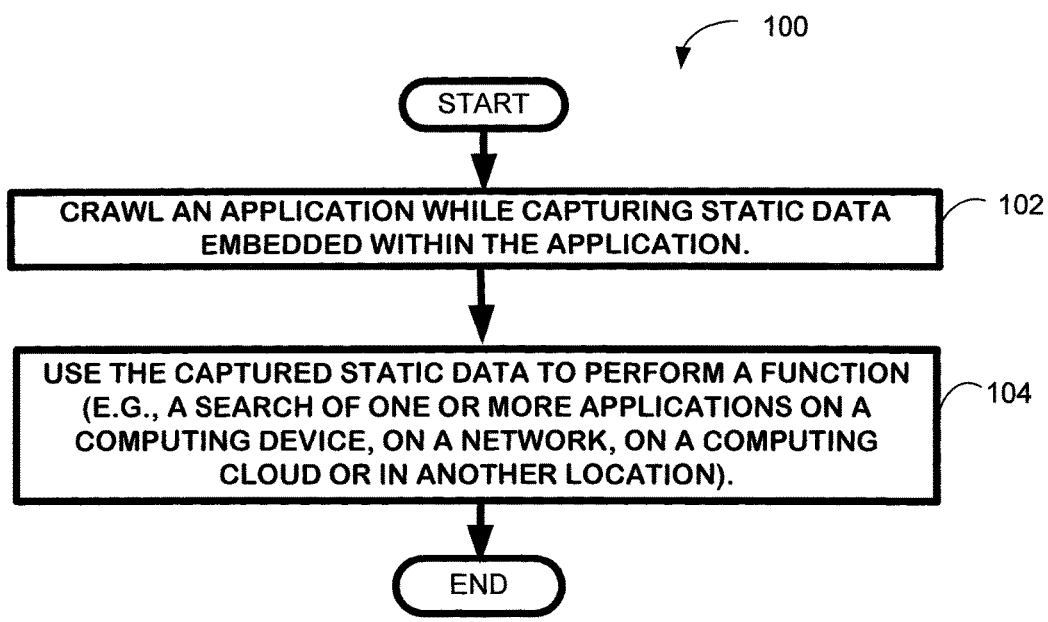
FIG. 1 depicts a flow diagram of an exemplary process of the deep application crawling technique for extracting static data.

In the following description of the deep application crawling technique, reference is made to the accompanying drawings, which form a part thereof, and which show by way of illustration examples by which the deep application crawling technique described herein may be practiced. It is to be understood that other embodiments may be utilized and structural changes may be made without departing from the scope of the claimed subject matter.

1.0 Deep Application Crawling Technique

The following sections provide background information and an overview of the deep application crawling technique, as well as exemplary processes and an exemplary architecture for practicing the technique. Details of various embodiments of the deep application crawling technique are also provided, as are descriptions of various possible usage scenarios.

1.1 Background and Overview of the Technique

In general, applications, or apps, contain valuable information. In fact, increasingly more content is stored inside of apps. Although there are many Web crawlers that crawl the content of websites on the World Wide Web, there are no crawlers that crawl content inside applications and extract content for various purposes, such as, for example, for search engines to use for locating data in response to user queries. Hence, much of the content inside of apps is not available for use by search engines or for other purposes.

Conventional Web crawlers are used by Internet search engines to collect information about Web sites and individual Web pages. The search engines need this information from Web sites and Web pages in order to know what pages to display in response to a search query. To this end, Web crawlers crawl through the Internet and catalog lists of data on Web sites. As a specific Web site is crawled by a Web crawler, the crawler reads through the text, hyperlinks, and meta tags on the Web site and uses this information to create a profile for the Web site to be used by the search engine. The search engine then indexes and uses this profile of each Website or Web page to provide search results in response to a search query. Typically this is done by matching keywords in the query to keywords in the profiles of each Web page or Website.

As discussed previously, there have previously been no crawlers that crawl applications in order to extract the content of applications residing on mobile computing devices, mobile phones, tablet computers, desktop computers, servers, or a computing cloud.

Instead of crawling Web pages and Web sites, the deep application crawling technique described herein crawls applications, or apps, in order to extract information inside of them. This can involve crawling and extracting static data that are embedded within apps or associated resource files, as well as dynamic data that apps download from the Internet or display to the user on demand. This extracted data can then be used to assist in searching for data in one or more applications on a computing device or in one or more applications on a network, server, computing cloud or other location.

1.2 Exemplary Processes

FIG. 1 depicts one exemplary computer-implemented process 100 for extracting data from a computer application according to the deep application crawling technique. At a very high level, as shown in FIG. 1, block 102, the technique crawls the application while capturing static data embedded within the application.

In order to extract the static data in the application, the binary code (or source code) of the application is analyzed to identify static data. (Whatever data is found within the app is considered to be static. Resource files that apps store locally are also considered as static. In contrast to static data, dynamic data is data that is downloaded from a computing cloud, the World Wide Web or other network.) This analyzing of the static data can be done, for example, by using a binary code analyzer tool such as Common Compiler Infrastructure (CCI). The static data is identified and extracted from the binary data (or source code) of the application. For example, the static data can include any local resource that an app stores locally for use doing run time, such as for example, one or more meta tags, hyperlinks, text files (XML, CSV, and so forth), URLs, or binary files, such as database files, in the application itself or in one or more resource files associated with the application.

As shown in block 104, the static data captured from the application can then be used to perform a function. For example, the static data captured from the application can be used to perform a search for data in one or more applications on a computing device. Alternately, the captured static data can be used to perform a search for data in applications on a network or computing cloud. Still another use for the static data is to understand the topic of an app, or topics of various pages of an app. The topics can then be used to choose in-app advertisements related to the topics when a user is using the application in order to provide advertisements targeted to the user's interests. Yet another use is to recommend goods and services to a user. Many other uses are possible.

Figure 2:
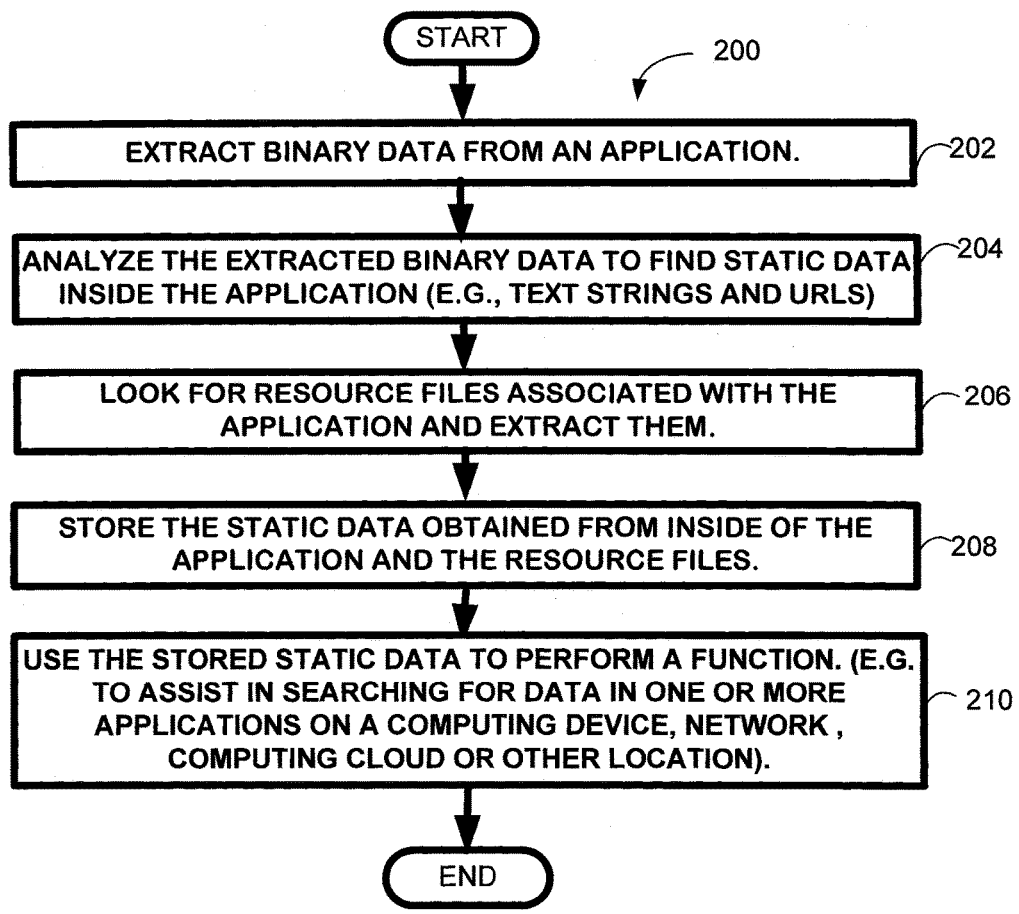
FIG. 2 depicts another flow diagram of an exemplary process of the deep application crawling technique for extracting static data.

A more detailed embodiment 200 for crawling and extracting static data from one or more applications according to the deep application crawling technique is shown in FIG. 2. As shown in block 202, binary data is extracted from an application. The extracted binary data is analyzed to find static data inside of the application, for example, meta data, text strings and hyperlinks, as shown in block 204. Additionally, as shown in block 206, static data is extracted from text resource files that are associated with the application. The static data obtained from inside the application and the associated resource files can be stored and indexed, as shown in block 208. For example, the data can be stored as simple text files or annotated XML files such that information retrieval and indexing algorithms used for existing search engines can be readily used. The stored static data can then be used to perform a function, as shown in block 210. For example, the stored static data can be used by a search engine in searching for data in one or more applications on a computing device or in one or more other locations (e.g., network, computing cloud, server).

In one embodiment, the deep application crawling technique can also extract dynamic data from the application and optionally combine it with the extracted static data in order to perform functions such as, for example, search functions (or advertisement functions, recommendation functions, or many other functions). The dynamic data can then be used in addition to the captured static data to provide data to perform various functions (e.g., for a search of one or more applications, to identify topics applicable to the application in order to target the application for advertisements specific to the application, or to provide recommendations or perform other desired functions). The process of capturing dynamic data inside of an application can also be used in a stand-alone mode.

Figure 3:
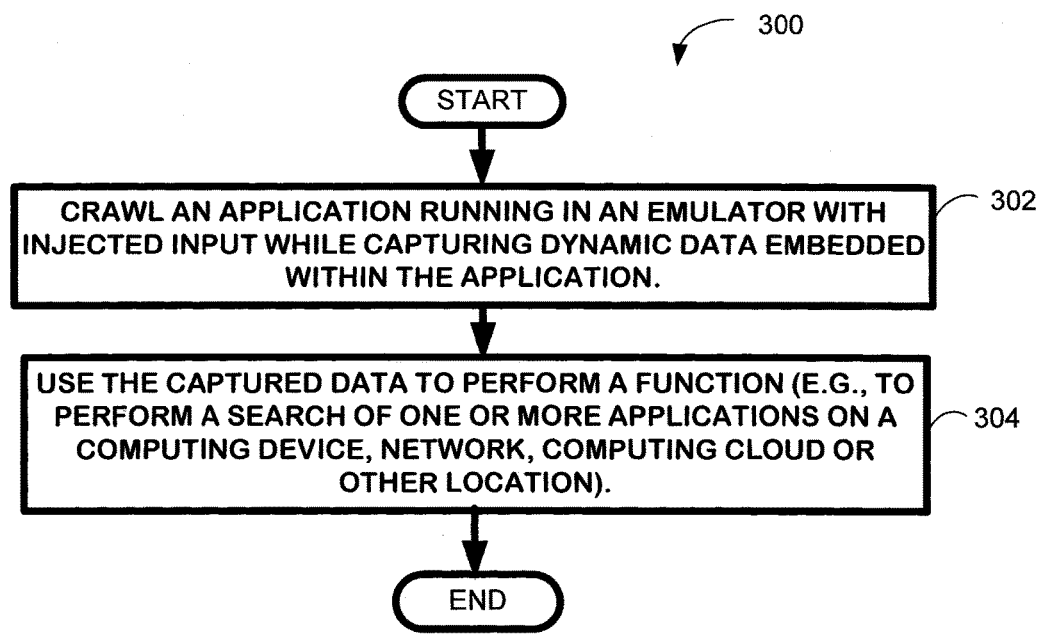
FIG. 3 depicts a flow diagram of another exemplary process of the deep application crawling technique described herein which extracts dynamic data.
Figure 4:
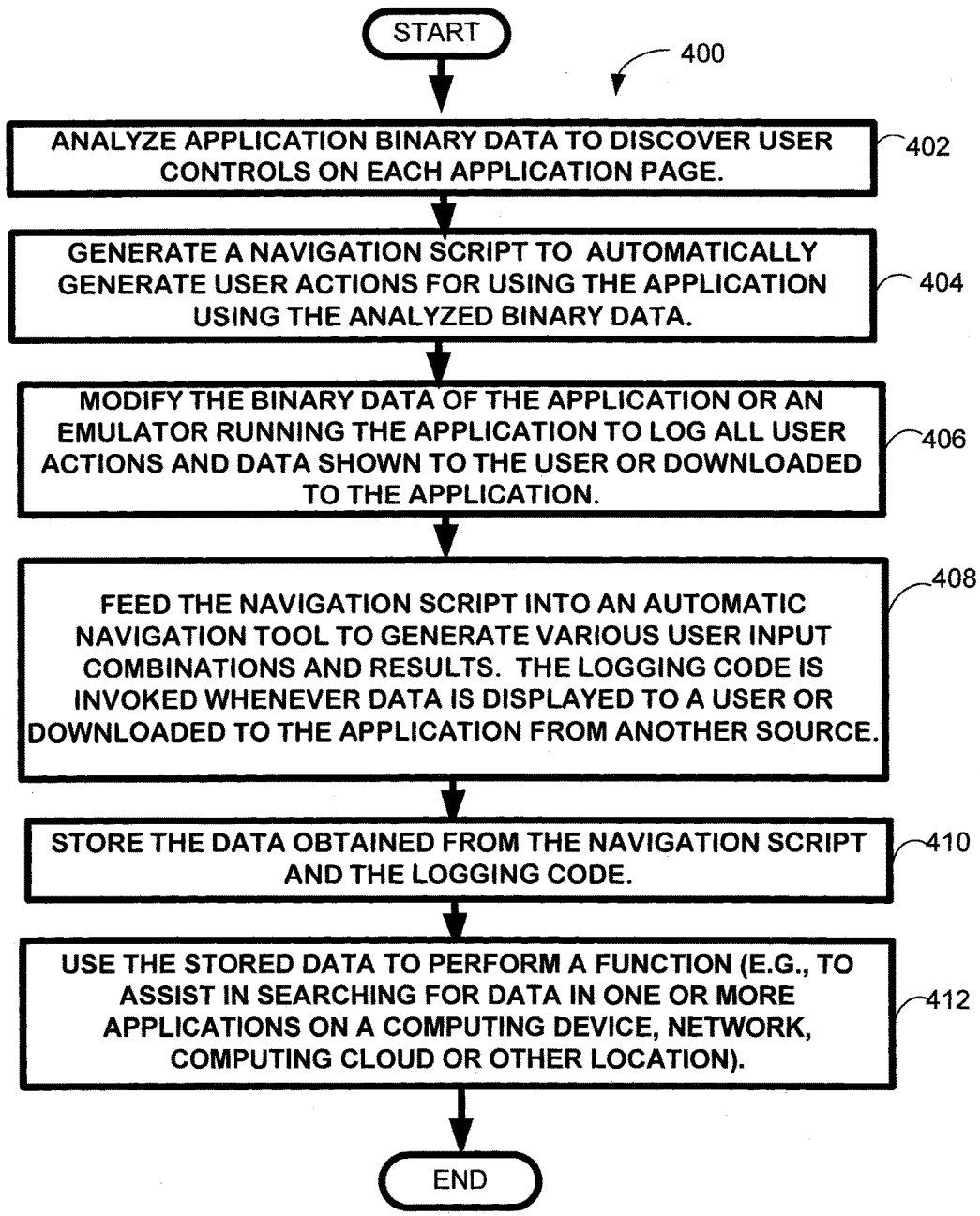
FIG. 4 depicts another flow diagram of another exemplary process of the deep application crawling technique described herein which extracts dynamic data.

FIGS. 3 and 4 provide exemplary processes for extracting dynamic data in accordance with the deep application crawling technique.

FIG. 3 depicts a general exemplary computer-implemented process 300 for extracting dynamic data from a computer application. In this exemplary process an application is run in an emulator while simulating user input. The emulator can be, for example, running on a server or in a computing cloud. Either the application can be injected with logging code, or the emulator can be instrumented, to capture the dynamic data. Dynamic data is captured for the application running in the emulator, as shown in block 302. As shown in block 304, this dynamic data can then be stored and be used to assist in performing a search of one or more applications on a computing device or on a network or computing cloud, for example, or to perform other desired functions.

FIG. 4 provides a more detailed embodiment 400 for extracting dynamic data according to one embodiment of the deep application crawling technique. As shown in block 402, in order to capture the dynamic data, prior to running the application in the emulator with injected logging code, binary data of the application is analyzed in order to discover user controls on each page of the application. As shown in block 404, a navigation script is generated that can generate user control actions for the application based on this analysis. For example, a portion of a navigation script could be as follows:

1. Launch app A
2. Enter 'Seattle' on the textbox named 'city' at screen position 20,30
3. Click on button named 'OK' at screen position 50,60
4. Click at position 40,30, on the $2^{nd}$ item on the list named 'local_restaurants'
5. . . .

The navigation script is executed by a navigation tool in order to simulate possible user navigation actions.

The application or the emulator is modified to log all user actions and data shown to the user or downloaded to the application, as shown in block 406. The logging code is invoked whenever data is displayed to the user or downloaded to the application. The created navigation script is then injected into the application running in an emulator (with either the application or the emulator being instrumented) in order to capture data displayed to a user and/or data that is downloaded by the application from a network or other source, as shown in block 408. This captured dynamic data is then stored, as shown in block 410. The stored data can then be used to perform various tasks, such as, for example, to assist in searching for data in one or more applications on a computing device or in one or more other locations, such as, for example, a computing cloud.

It should be noted that the above-described captured dynamic data can also be combined with captured static data captured from the application as described with respect to FIGS. 1 and 2 in order to enhance the search capabilities or other desired functions obtained by using the dynamic data alone.

Exemplary processes for practicing the deep application crawling technique having been described, the following section discusses an exemplary architecture for practicing the technique.

1.4 Exemplary Architecture

Figure 5:
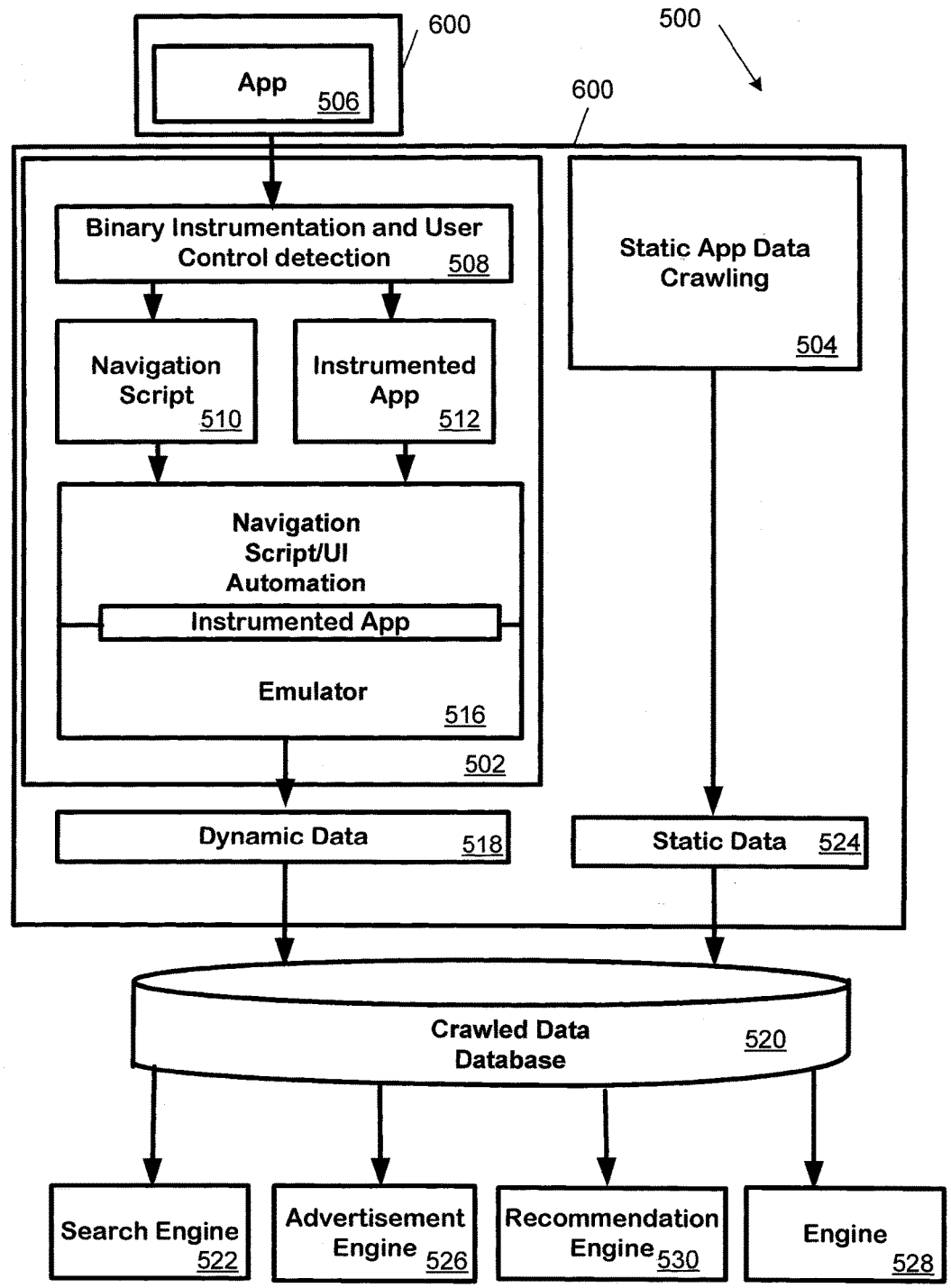
FIG. 5 is an exemplary architecture for practicing one exemplary embodiment of the deep application crawling technique described herein.

FIG. 5 shows an exemplary architecture 500 for employing one embodiment of the deep application crawling technique. As shown in FIG. 5, this exemplary architecture 500 includes a deep application dynamic data crawling module 502, and a deep application static crawling module 504, that both reside on a general purpose computing device 600 such as, for example, will be discussed in greater detail with respect to FIG. 6. Alternately the deep application crawling modules 502 and 504 can reside on a server or on a computing cloud. An application 506 interfaces with the deep application dynamic crawling module 502 and the deep application static data crawling module 504. The application 506 can also reside on a general purpose computing device 600, such as, for example a smart phone or desktop computer.

A binary instrumentation and user control detection module 508, in the deep application dynamic crawling module 502, detects and captures binary data in the application and can also detect and capture user control actions. This binary instrumentation and user control detection module 508 analyzes the captured data to discern the actions that the user can perform with the application 506 and what data is displayed to the user and/or downloaded to the user's computing device. This can be done by injecting logging code within the target application. For example, suppose an app has an instruction, which displays 'Hello World!" in a textbox control:

Textbox.display('textbox_name', 'Hello World!')

The application/app instrumentation will add a new instruction immediately after the above instruction within the target app:

Log("Hello World!")

The Log function writes the data to a local file. Note that if the emulator is instrumented instead of the app, the Log method call is placed inside the Textbox.display method of the emulator. An advantage to this configuration is that each and every app does not need to be modified; any app that uses Textbox.display will transparently use the modified display method that logs data in the background.

The captured data is then used to generate a navigation script 510 for the application (e.g., user controls on each app page to include buttons, lists, and so forth). For example, this navigation script can be in the form of a navigation tree. The captured binary data of the application is also analyzed in order to create an instrumented version of the application 514 (or an instrumented version of an emulator running the application) in order to capture the generated dynamic data 518. The navigation script 510 is feed into the instrumented version of the application 514 running in an emulator 516 in order to automatically navigate through the application while capturing whatever dynamic data 518 is displayed to the user or downloaded to the application. This dynamic data 518 can be stored in a crawled data database 520. The data in the crawled data base 520 can then be provided to an engine 528 to allow the engine to perform a function of the engine. For example, the data in the crawled database can be input into a search engine similar to other crawled data in order to improve search results obtained by the search engine 522. Or the dynamic data 518 stored in the crawled database 520 can be used by an advertisement engine 526 to select application-specific advertisements to associate with the application. Likewise, the crawled data can be used by a recommendation engine 530. Many other functions and uses of the crawled stored data are possible.

The deep application static crawling module 504 analyzes the binary data of the application in order to find static data 524 within the application itself or in resource files associated with the application. This can be done, for example, by using a binary code analysis framework such as Common Compiler Infrastructure (CCI) to find and extract static binary data from the application and associated files. The static data 524 can include, for example, one or more text strings and data extracted from one or more resource files associated with the application. Like the dynamic data, this static data can be stored in the crawled data database 520. The data in the crawled data base can then be provided to an engine 528 to perform a function of the engine. For example, the data in the crawled database can be input into a search engine 522 in order to provide search results related to the content of the application when the search engine 522 searches for the content of one or more applications (e.g., on a computing device or in other locations). Or the dynamic data 518 stored in the crawled database 520 can be used by an advertisement engine 526 to select application-specific advertisements to associate with the application. Likewise, the crawled data can be used by a recommendation engine 530. Many other functions and uses of the crawled stored data are possible.

It should be noted that the dynamic data described herein can vary by location. For example, many applications are location dependent in that they consider location data when providing requested data to a user. When a user brings up an application to recommend restaurants in an area, or gas stations in an area, for example, the results an application provides will vary by location since restaurants in a location other than the user's location of interest would not be relevant. To this end, the dynamic data 518 in the crawled data database 520 will vary based on location. In this case it may be necessary to inject a navigation script into various instrumented applications running in an emulator that vary by location in order to extract appropriate location-specific dynamic data to be used by a search engine. Similarly, advertisements or recommendations can be targeted in a location-specific manner.

1.5 Exemplary Usage Scenarios

The deep application crawling technique can be used in various scenarios. For example, as discussed previously, the dynamic and static content extracted from an application can be used for an improved application search experience. Current search engines do not allow for the search of the content of an application in order to extract data that can be used to assist a search engine in identifying sources from which to extract search results. For example, major search engines currently only use the title of an application or any associated manually created description of the application, not the content of the application itself, when searching for sources that might yield relevant search results.

One exemplary usage scenario for the deep application crawling technique is to use the technique to perform a marketplace search on the World Wide Web. For example, a user might search for "deals for Hawaii vacation" on their mobile computing device and get a deal referred to them from an application in response. Or a user might use a major search engine to search for "increase battery life of a WP" (where WP refers to a Microsoft® Corporation's Windows® based phone), and the technique may assist in providing the search engine with results from data inside a "WP tips and tricks" application. The search engine might also show an advertisement for the "WP tips and tricks" application (e.g., along with the search result) and ask the user to purchase it.

Another usage scenario is to let a user search for content across all of the applications that he has on his computing device (e.g., for example, his mobile phone). For example, a user using the deep application crawling technique described herein might search for "which of my 10 coupon apps have a deal on a Hawaii vacation today?", and the technique can indicate to him which of the applications that reside on his mobile phone have such Hawaii vacation coupons.

Alternately, in one embodiment the user can request alerts for certain information using the deep application crawling technique so that the user is alerted when the data he is looking for becomes available. For example, the user can specify that he would like to be notified when one or more applications have deals on vacations in Hawaii. The technique will then periodically crawl all applications (e.g., on his device or in a computing cloud) and generate and alert when such a deal on a vacation to Hawaii is found so the user does not manually have to repeatedly conduct this search.

Still another use for the static data is to understand the topic of an app, or topics of various pages of an app. The topics can then be used to choose in-app advertisements related to the topics. For example, if a user is using an app about a local business, in-app ad-controls can show ads related to local businesses. For example, if the user is looking at the 'restaurants' page of an app, advertisements about local restaurants can be displayed. This embodiment of the technique assumes that the app or app page that the user is currently viewing reflects his intent, and ads targeted to his intent are more effective.

Another use the crawled data is by a recommendation engine that recommends items such as, for example, goods and services. For example, an application may include a recommendation box that can allow the application to display recommended services or products and even provide coupons for these.

Another usage scenario for using the crawled data in to crawl two applications in order to determine how much of the crawled data they have in common. This information can be useful in determining how similar the two applications are, suggesting that one was possibly copied from the other.

Figure 6:
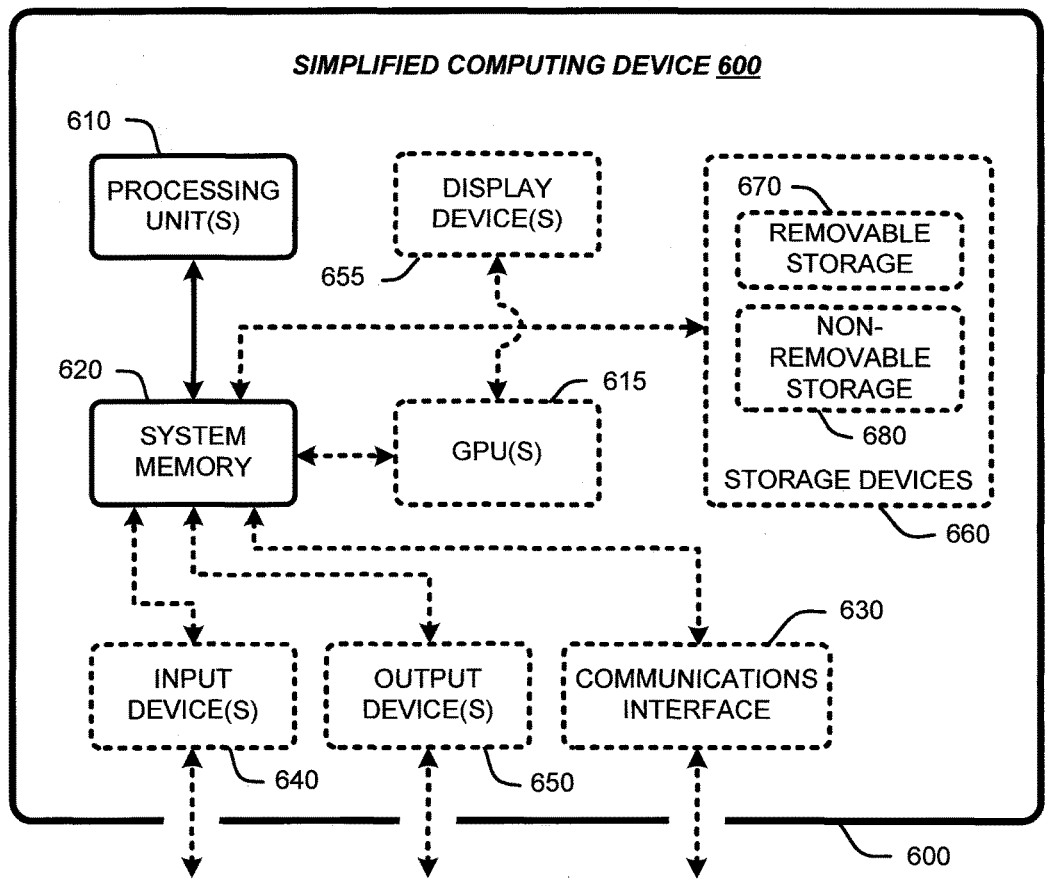
FIG. 6 is a schematic of an exemplary computing environment which can be used to practice the deep application crawling technique.

2.0 Exemplary Operating Environments:

The deep application crawling technique described herein is operational within numerous types of general purpose or special purpose computing system environments or configurations. FIG. 6 illustrates a simplified example of a general-purpose computer system on which various embodiments and elements of the deep application crawling technique, as described herein, may be implemented. It should be noted that any boxes that are represented by broken or dashed lines in FIG. 6 represent alternate embodiments of the simplified computing device, and that any or all of these alternate embodiments, as described below, may be used in combination with other alternate embodiments that are described throughout this document.

For example, FIG. 6 shows a general system diagram showing a simplified computing device 600. Such computing devices can be typically be found in devices having at least some minimum computational capability, including, but not limited to, personal computers, server computers, hand-held computing devices, laptop or mobile computers, communications devices such as cell phones and PDA's, multiprocessor systems, microprocessor-based systems, set top boxes, programmable consumer electronics, network PCs, minicomputers, mainframe computers, audio or video media players, etc.

To allow a device to implement the deep application crawling technique, the device should have a sufficient computational capability and system memory to enable basic computational operations. In particular, as illustrated by FIG. 6, the computational capability is generally illustrated by one or more processing unit(s) 610, and may also include one or more GPUs 615, either or both in communication with system memory 620. Note that that the processing unit(s) 610 of the general computing device may be specialized microprocessors, such as a DSP, a VLIW, or other micro-controller, or can be conventional CPUs having one or more processing cores, including specialized GPU-based cores in a multi-core CPU.

In addition, the simplified computing device of FIG. 6 may also include other components, such as, for example, a communications interface 630. The simplified computing device of FIG. 6 may also include one or more conventional computer input devices 640 (e.g., pointing devices, keyboards, audio input devices, video input devices, haptic input devices, devices for receiving wired or wireless data transmissions, etc.). The simplified computing device of FIG. 6 may also include other optional components, such as, for example, one or more conventional computer output devices 650 (e.g., display device(s) 655, audio output devices, video output devices, devices for transmitting wired or wireless data transmissions, etc.). Note that typical communications interfaces 630, input devices 640, output devices 650, and storage devices 660 for general-purpose computers are well known to those skilled in the art, and will not be described in detail herein.

The simplified computing device of FIG. 6 may also include a variety of computer readable media. Computer readable media can be any available media that can be accessed by computer 600 via storage devices 660 and includes both volatile and nonvolatile media that is either removable 670 and/or non-removable 680, for storage of information such as computer-readable or computer-executable instructions, data structures, program modules, or other data. By way of example, and not limitation, computer readable media may comprise computer storage media and communication media. Computer storage media includes, but is not limited to, computer or machine readable media or storage devices such as DVD's, CD's, floppy disks, tape drives, hard drives, optical drives, solid state memory devices, RAM, ROM, EEPROM, flash memory or other memory technology, magnetic cassettes, magnetic tapes, magnetic disk storage, or other magnetic storage devices, or any other device which can be used to store the desired information and which can be accessed by one or more computing devices.

Storage of information such as computer-readable or computer-executable instructions, data structures, program modules, etc., can also be accomplished by using any of a variety of the aforementioned communication media to encode one or more modulated data signals or carrier waves, or other transport mechanisms or communications protocols, and includes any wired or wireless information delivery mechanism. Note that the terms "modulated data signal" or "carrier wave" generally refer a signal that has one or more of its characteristics set or changed in such a manner as to encode information in the signal. For example, communication media includes wired media such as a wired network or direct-wired connection carrying one or more modulated data signals, and wireless media such as acoustic, RF, infrared, laser, and other wireless media for transmitting and/or receiving one or more modulated data signals or carrier waves. Combinations of the any of the above should also be included within the scope of communication media.

Further, software, programs, and/or computer program products embodying the some or all of the various embodiments of the deep application crawling technique described herein, or portions thereof, may be stored, received, transmitted, or read from any desired combination of computer or machine readable media or storage devices and communication media in the form of computer executable instructions or other data structures.

Finally, the deep application crawling technique described herein may be further described in the general context of computer-executable instructions, such as program modules, being executed by a computing device. Generally, program modules include routines, programs, objects, components, data structures, etc., that perform particular tasks or implement particular abstract data types. The embodiments described herein may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices. Still further, the aforementioned instructions may be implemented, in part or in whole, as hardware logic circuits, which may or may not include a processor.

It should also be noted that any or all of the aforementioned alternate embodiments described herein may be used in any combination desired to form additional hybrid embodiments. Although the subject matter has been described in language specific to structural features and/or methodological acts, it is to be understood that the subject matter defined in the appended claims is not necessarily limited to the specific features or acts described above. The specific features and acts described above are disclosed as example forms of implementing the claims.

What is claimed is:

1. A computer-implemented process, comprising:
using an application crawler to crawl source code or binary code of an application, the application configured for execution on a computing device;
capturing static data embedded within the source code or the binary code of the application;
generating a navigation script based upon the captured static data;
executing the application in an emulator, wherein the emulator, when executing the application, uses the navigation script to cause the application to download dynamic data from the Internet;
capturing the dynamic data downloaded by the application when the application is executed in the emulator; and
indexing the captured static data and the captured dynamic data, wherein the indexed captured static data and the indexed captured dynamic data is used by a search engine to return search results in response to a user query.

2. The computer-implemented process of claim 1 wherein the captured static data comprises a local resource that the application stores locally for use during run time.

3. The computer-implemented process of claim 1 wherein the computing device is a mobile computing device.

4. The computer-implemented process of claim 3 wherein the mobile computing device is a mobile phone.

5. The computer-implemented process of claim 3 wherein the mobile computing device is a tablet computer.

6. The computer-implemented process of claim 1 wherein the captured static data is extracted from the binary code of the application.

7. The computer-implemented process of claim 6 wherein the static data is analyzed using a binary code analyzer tool.

8. The computer-implemented process of claim 6 wherein extracted binary data comprises text strings, Uniform Resource Locators, hyperlinks and meta data.

9. The computer-implemented process of claim 1 wherein the captured static data is extracted from one or more resource files associated with the application.

10. The computer-implemented process of claim 1 wherein the search engine returns the application as a search result in response to receipt of the user query based upon the indexed captured static data and the indexed captured dynamic data.

11. A system for extracting data from a computer application that is configured for execution by a mobile computing device, the system comprising:
- a computing device; and
- a computer program comprising program modules executable by the computing device, wherein the computing device is directed by the program modules of the computer program to:
  - crawl source code or binary code of the computer application that resides in memory of the computing device to capture static data embedded within the source code or the binary code of the computer application;
  - generate a navigation script based upon the captured static data;
  - execute the computer application in an emulator, wherein the emulator, when executing the computer application, uses the navigation script to cause the computer application to download dynamic data from the Internet;
  - capture the dynamic data downloaded by the computer application; and
  - store the captured static data and the captured dynamic data, wherein a search engine returns a search result in response to receipt of a query based upon the stored captured static data and the stored captured dynamic data.

12. The system of claim 11 wherein the search result includes portions of the stored captured static data.

13. The system of claim 12 wherein a returned portion of the stored captured static data is a hyperlink which is used to access content of the computer application.

14. The system of claim 11 wherein the stored captured static data is submitted to a recommendation engine and wherein the function of the recommendation engine is to recommend goods and services.

15. A computer-implemented process for extracting content from an application, the computer-implemented process comprising:
- crawling source code or binary code of the application residing in the memory of a computing device, wherein the application is configured for execution by a mobile computing device;
- capturing static content embedded within the source code or the binary code of the application;
- storing the captured static content;
- generating a navigation script based upon the stored captured static content;
- executing the application in an emulator, wherein the emulator, when executing the application using the navigation script, causes the application to download dynamic content from the Internet;
- capturing the dynamic content downloaded by the application;
- storing the captured dynamic content;
- receiving a search query;
- searching the stored captured static content and the stored captured dynamic content in response to receiving the search query; and
- outputting a search result based upon the stored captured static content and the stored captured dynamic content, the search result being in the form of a hyperlink.

16. The computer-implemented process of claim 15, the mobile computing device being a mobile telephone.

17. The computer-implemented process of claim 15, the mobile computing device being a tablet computer.

18. The computer-implemented process of claim 15, wherein the captured static content comprises a local resource that the application stores locally for use during run time.

19. The computer-implemented process of claim 15, wherein the application is available for download from an application marketplace.

20. The computer-implemented process of claim 15, wherein the hyperlink points to at least one of the stored captured static content or the stored captured dynamic content.

* * * * *